May 2, 1961 E. F. MEKELBURG 2,982,832
ELECTRICAL DEVICE
Filed July 8, 1958 3 Sheets-Sheet 1
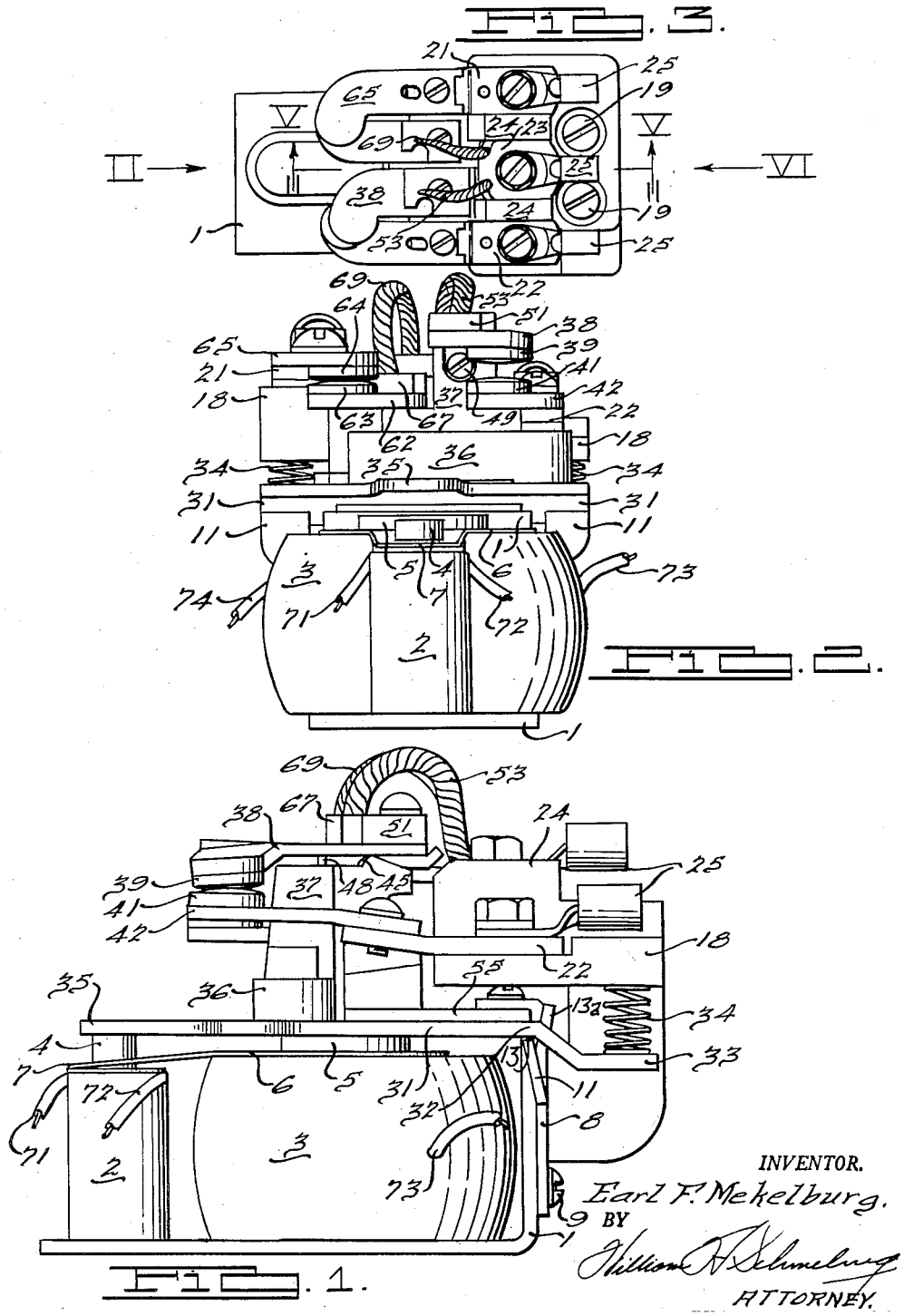
INVENTOR.
Earl F. Mekelburg.
BY
William H. Schmelzer
ATTORNEY.

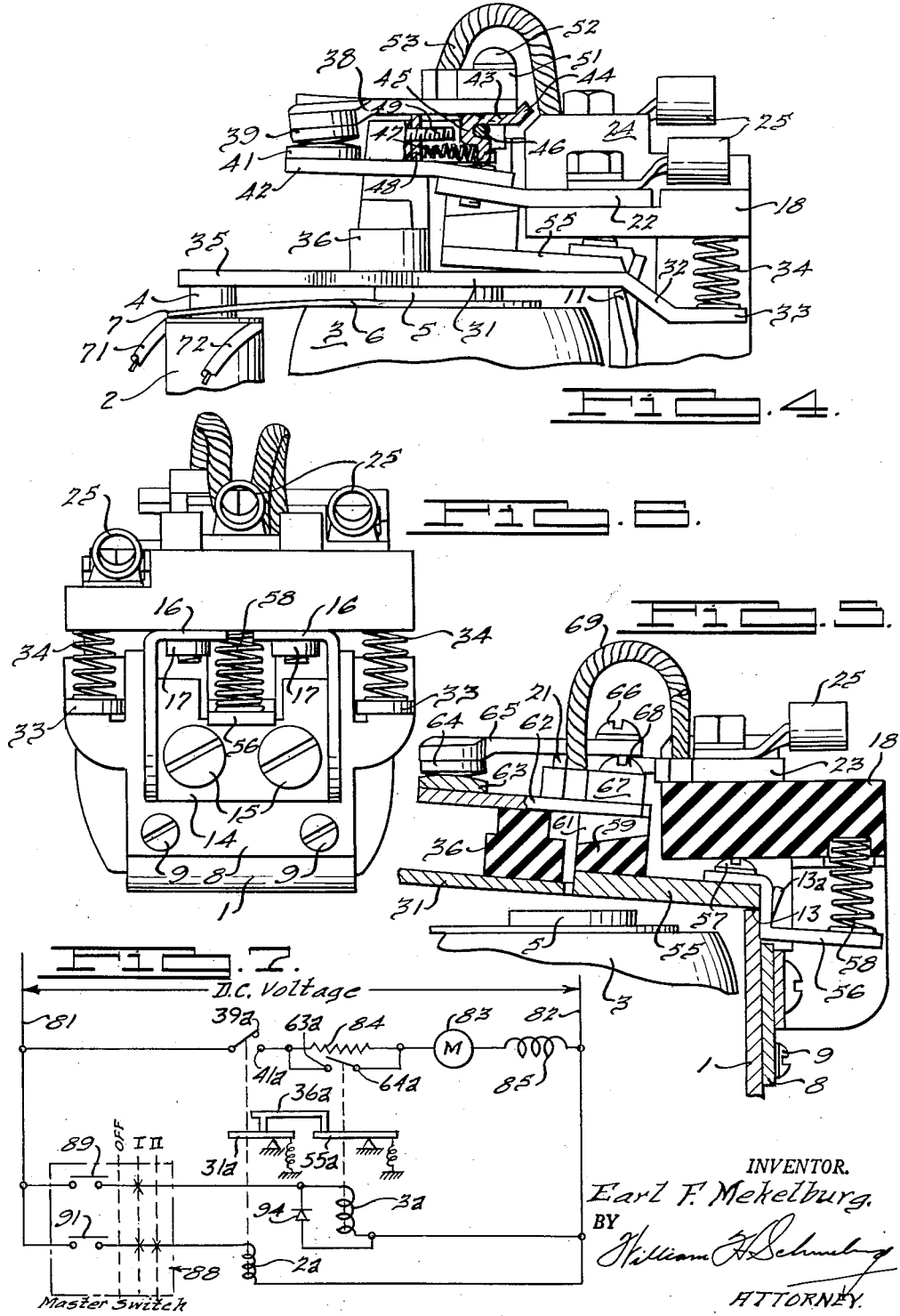

May 2, 1961 E. F. MEKELBURG 2,982,832
ELECTRICAL DEVICE
Filed July 8, 1958 3 Sheets-Sheet 3

INVENTOR.
EARL F. MEKELBURG
BY
William H. Schmelzy

United States Patent Office 2,982,832
Patented May 2, 1961

2,982,832

ELECTRICAL DEVICE

Earl F. Mekelburg, Wauwatosa, Wis., assignor to Square D Company, Detroit, Mich., a corporation of Michigan Filed July 8, 1958, Ser. No. 747,153

12 Claims. (Cl. 200—103)

This invention relates to electric switches and more particularly, to electromagnetically operated switches of the type known as magnetic contactors.

Magnetic contactors presently known to the art satisfy the need for a safe and convenient means to complete or interrupt electric circuits. Where line voltage starting of small D.C. motors is objectionable, a magnetic contactor having a means for reducing line voltage to a lower starting voltage until such time as the motor approaches its normal operating speed is often utilized. It is desirable that such a means be mechanically as well as electrically related to the magnetic contactor in such a manner as to preclude the possibility of line voltage being placed across the motor terminals with the motor in the stopped condition. A further desirable feature of a magnetic contactor having a positive voltage reducing means is a controllable time delay between energization of the motor circuit and removal of the voltage reducing means, ensuring a finite period for motor acceleration.

An object of the present invention is to provide a magnetic contactor having a positive means for reducing line voltage.

A further object of the present invention is to provide a magnetic contactor that inserts a voltage reducing means in a motor circuit prior to energization of said motor circuit.

Another object of the present invention is to provide a magnetic contactor with a mechanical interlock between the voltage reducing means and the main energization circuit for positive insertion of the voltage reducing means prior to the energization of said circuit.

A still further object of the present invention is to provide a magnetic contactor that will control the insertion of a voltage reducing means in a motor circuit prior to energization of said circuit and removes said means in a finite period after energization of said circuit.

A further object of the present invention is to include in a magnetic contactor having a timing circuit associated therewith, an arrangement for adjusting the timing characteristics of the contactor by changing the relative polarization of the electromagnetic coils of the contactor.

Another object of the present invention is to arrange the parts and circuits of a magnetic contactor to minimize or eliminate the effects of residual magnetism of the operating coils of the device so the effects of the residual magnetism will not effect the timing of the device.

The magnetic contactor and circuits hereinafter described is particularly suited for use in electric trucks which are well known. These trucks are operated from storage batteries. It is to be appreciated that the energy available to operate the electric motors of the truck will be dependent upon the available energy of the batteries. Thus during the initial operation of the truck after the batteries have been freshly charged, the batteries will have excess capacity to operate the control system. However, after the trucks have been in service for an appreciable period, the available energy output of the batteries will be considerably reduced. From the foregoing it is apparent that a control system for an electric truck must operate with a minimum current consumption and over a wide range of available voltages and currents. Further, because of space limitations, the devices must be compact and still be capable of handling large current values with great reliability.

Further objects and features of the invention will be readily apparent to those skilled in the art from the specification and appended drawing illustrating certain preferred embodiments in which:

Fig. 1 is a side elevational view of the contactor of the present invention showing both coils energized.

Fig. 2 is a front elevational view of the contactor of the present invention in de-energized condition.

Fig. 3 is a top plan view of the contactor.

Fig. 4 is a partial side elevational view showing the contactor with the small coil only energized.

Fig. 5 is a partial sectional view showing the contactor with both coils de-energized.

Fig. 6 is a rear elevational view of the contactor.

Fig. 7 is a schematic drawing illustrating the connection of the contactor and its contacts with a load and a master switch through which the contactor is energized.

Figure 9:
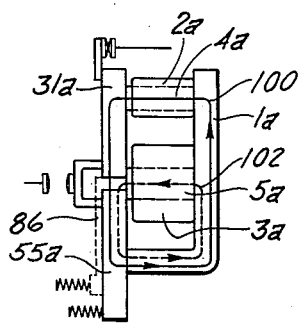

Fig. 9 diagrammatically shows the flux paths through the device according to the present invention when both electromagnets are energized.

Figure 10:
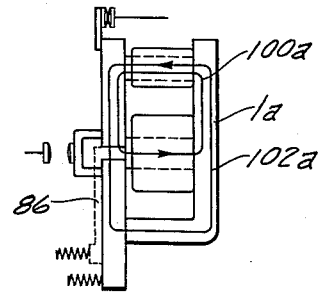

Fig. 10 shows the flux paths of the device in Fig. 9 when only one of the electromagnets is energized.

Figure 11:
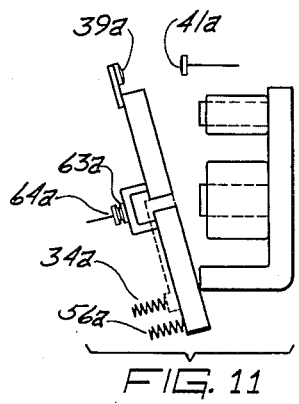
Figures 12, 13:
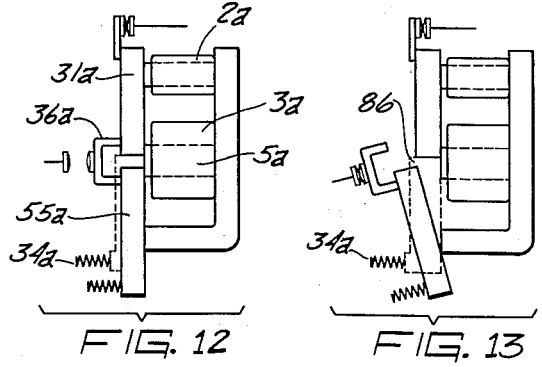

Figs. 11, 12 and 13 diagrammatically show the operations of the device according to the present invention.

The contactor of the present invention comprises a sheet metal frame 1 (Fig. 1) having a pair of electromagnetic coils 2 and 3 supported on a pair of axially aligned and transversely spaced magnetizable cores 4 and 5 respectively. The core 5 has a shouldered end that extends above the coil 3 to support a resilient non-magnetic strip 6. The strip 6 has an extending end 7 that surrounds the core 4 so as to maintain the coil 2 on the core 4. A sheet metal plate 8 is secured to the back of the frame 1 as by a pair of screws 9 and it provides a fulcrum at points 11 and 13 to accommodate pivoted members to be described. A cup-like bracket member 14 having a pair of inwardly turned flanges 16 that support a threaded bushing 17 respectively, is secured as by a pair of screws 15 to the back of the frame 1 (Fig. 6).

A stationary contact support 18 of insulating material is secured to the flanges 16 as by a pair of screws 19 (Fig. 3) that extend into threaded engagement with the bushings 17. The contact support 18 carries at its upper surface a pair of conducting members 21 and 22 and a central combination terminal post and flexible conductor support 23 (Fig. 3). The contact support 18 is provided with a pair of separating ribs 24 for spacing the conducting members 21, 22, and 23. A plurality of conventional terminal lugs 25 are provided for the conducting members 21, 22 and 23 respectively to accommodate conductors for connection to any desired load device to be controlled by the contactor.

A substantially U-shaped magnetizable armature 31 is supported by the fulcrum 11. The armature 31 has a fold at 32 for cooperation with the fulcrum 11, and a pair of spring guide surface at 33 for cooperation with a pair of biasing springs 34 that normally maintain the armature in its deenergized position. The U-shaped armature 31 has a finger portion 35 extending in an opposite direction from the legs of its U-shape in cooperating alignment with the core 4 about which the coil 2 is positioned (Fig. 3).

An insulating member 36 is secured to the upper surface of the armature 31 and has an upstanding central portion 37 that supports a movable contact carrier 38. A contact surface 39 is secured to the contact carrier 38 in cooperating alignment with a contact 41 on a stationary contact carrier 42. The contact carrier 42 and the conducting strip 22, are secured to the stationary contact support 18 as by screws. The movable contact carrier 38 is held on the upstanding central portion 37 by a spring biased free support 43 to provide for contact wiping between the contacts 39 and 41. The support 43 (Fig. 4) has a folded end at 44 that locates the movable contact carrier 38 and a bearing surface at 45 journaled about a pivot pin 46. The support 43 cooperates with a biasing spring 47 that operates between the bearing surface 45 and a housing 48. A screw 49 secures the housing 48 to the central portion 37 of the insulating member 36. A terminal block 51 is secured to the upper surface of the movable carrier 38 as by a screw 52 and has secured thereto a flexible conductor 53 that is fixed at its other end to the conducting member 23 mounted on the contact support 18.

A second magnetizable armature 55 (Fig. 5) is pivoted with respect to the frame 1 on the fulcrum 13 and is maintained in position by lugs 13a of the member 8 and is provided with a spring seat surface 56, secured thereto as by a screw 57 for a biasing spring 58. The magnetizable armature 55 is positioned in cooperating alignment with the magnetizable core 5 of the electromagnetic coil 3 to be attracted to the core 5 upon energization of the coil 3. A support 59 of insulating material is fixed to the upper surface of the armature 55 and is provided with an elevated side portion at 61 that supports a second movable contact carrier 62. A contact surface 63 is provided on the contact carrier 62 in cooperating alignment with a stationary contact 64. The contact 64 is carried by a stationary contact carrier 65 fixed to the conducting strip 21 as by a screw 66. The conducting strip 21 is mounted on the contact support 18 as previously described. A terminal block 67 is attached to the upper surface of the movable contact carrier 62 as by a screw 68 and has one end of a flexible conductor 69 secured thereto, the other end of the conductor being fixed to the conducting strip 23 which is mounted on the contacts support 18.

The lower surfaces of the contact carriers 62 and 42 respectively cooperate (Figs. 5 and 2) with the upper surface of the insulating block 36 which is secured to the magnetizable armature 31, to act as stops and thereby locate the armature 31 in its de-energized position to which it is biased by the springs 34. The at-rest position of the movable contact carrier 62 on the armature 55, is located by the engagement of the contact surface 63 with the contact surface 64, and is biased into this position by the spring 58. The insulating block 36 on the armature 31 serves as an adjunct to the positioning of the contact carrier 62 by its spring 58 when the armature 31 is de-energized.

Operation of the magnetic contactor is preferably initiated by simultaneously energizing the electromagnetic coils 2 and 3 through the conductors 71–72 and 73–74 respectively. The armature 31 in cooperative alignment with the core 4 of the coil 2 has a wide initial air gap with respect to the core 4. The magnetic flux field developed in the core 4 is insufficient to attract the armature 31 against the action of the springs 34. However, when the armature 31 is carried into proximate relationship with the core 4, the magnetic flux developed by the coil 2 is strong enough to hold the armature 31. Means for carrying the armature 31 into proximate relationship with the core 4 is provided by a mechanical cooperation (Fig. 5) between the armature 55 and the armature 31. When the coil 3 is energized a strong magnetic flux is developed in the core 5. The flux in core 5 is sufficient to move the cooperating armature 55 into engagement with the core 5, thus completing a closed magnetic flux path through the frame 1. The armature 55 carries the insulating support 59, to which is secured the contact carrier 62 and contact 63. The underside of the contact carrier 62 bears against the insulating member 36 attached to the armature 31. Thus it will be seen that as the armature 55 moves to engage the core 5 in response to a magnetic flux developed by the coil 3 it carries the contact 63 out of engagement with the fixed contact 64 and carries the armature 31 into close proximity to the core 4 so the armature 31 may be subsequently engaged by the core 4 in response to the magnetic flux in the coil 2 as heretofore explained and carry the contact 39 into engagement with the fixed contact 41 with a wiping action (Fig. 1). When the flux circuit in the coil 3 is broken, the armature 55 is biased to its de-energized position by the spring 58, thus re-engaging the contact 63 with the fixed contact 64 without affecting the position of the armature 31. The mechanical interconnection between the armature 55 and the armature 31 operates to carry the armature 31 in one direction only, that is to proximate relationship to the core 4.

An application of the two step contactor of the present invention to the control of an electric motor is shown in a schematic diagram (Fig. 7) wherein the corresponding parts in Figs. 1–6 are provided with a suffix "a." A D.C. supply is provided by a pair of conductors 81 and 82 to an electric motor 83. A starting switch comprising normally open contacts 38a, 39a, and 41a, a starting resistor 84 and a field winding 85 are connected in series with the motor 83 across the conductors 81 and 82. A starting resistor shunting circuit is provided having a switch with normally closed contacts 63a and 64a to effect the shorting of the starting resistor 84 when the motor has attained a running speed. A master switch 88 having "OFF—I—II" steps of operation for the positioning of contacts 89 and 91 therein is connected between the energization lines 81 and 82 with an electromagnetic coil 2a energized through the contacts 91 and an electromagnetic coil 3a energized through the contacts 89. In the illustration of the master switch, closure of the contacts 89 and 91 in the steps "OFF—I—II" is indicated with an "X" in the switch position. A rectifier 94 is provided to shunt the electromagnetic coil 93 to function as a time delay as will be more fully discussed hereinafter.

From a comparison of the schematic illustration (Fig. 7) and the mechanical features of the two-step contactor of the present invention, it can be seen that the electromagnetic coils 2a and 3a are the counterparts of the electromagnetic coils 2 and 3 respectively of the contactor. A mechanical connection comprising a bar 36a is secured to an armature 55a which moves in response to a magnetic flux in the coil 3a. The bar 36a biases an armature 31a in close proximate relationship to the coil 2a. A mechanical interconnection is indicated by a dotted line connecting the electromagnetic coils 2a and 3a and their respective armatures 55a and 31a with the contacts 63a and 39a respectively. Individual biasing springs are shown for armatures 55a and 31a and each armature is shown pivoted to a common support.

With the master switch 88 in the No. I position the electromagnetic coil 3a is energized, thereby operating the armature 55a which first opens the contacts 63a and 64a, placing the starting resistor 84 in series with the motor 83 and secondly through the bar 36a, mechanically moves the armature 31a to proximate relationship with the coil 2a, enabling the coil 2a to move the armature 31a, thus closing the contacts 39a and 41a to energize the motor circuit. The first step of operation of the master switch has two distinct, sequential phases, even though both of the coils 2a and 3a may be simultaneously energized.

With the master switch 88 in the No. II position, the coil 2a alone will be energized, maintaining the contacts 39a and 41a closed and the coil 3a will be energized to permit the contacts 63a and 64a to return to their closed position to short out the starting resistor 84.

When the electromagnetic flux developed by the coil 3a collapses, a voltage is induced in coil 3a tending to maintain the current flowing in its initial direction. The current will flow in a loop path through a rectifier 94, thus maintaining the coil energized for a finite period depending upon the time constant of the combination of electromagnetic coil 3a and rectifier 94. After the inherent time delay due to collapse of the magnetic flux associated with coil 3a, contacts 63a and 64a will be closed and the starting resistor 84 will be shorted permitting the motor 83 to run directly on the line. In this manner starting of the motor will be effected through a contactor by a reduced starting voltage, full line voltage being applied after a time delay to permit the motor to approach its running speed.

Figure 8:
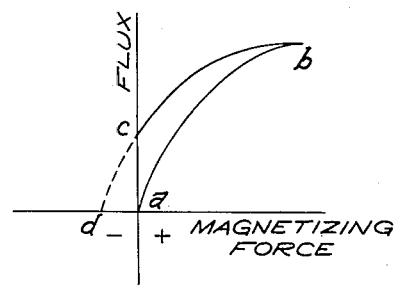
Fig. 8 shows a portion of a hysteresis curve of a typical magnet core illustrating the effect of the negative magnetizing force on the residual flux.

In view of the foregoing, it is believed that the theory of operation of the device according to the present invention may be further comprehended by an explanation of the simplified views as shown in Figs. 8–13 of the drawings, wherein the suffix "a" added to the numerals indicates corresponding parts of the device as shown and described in Figs. 1–6 of the drawings. In Fig. 8 of the drawings, a typical magnetization curve of the electromagnets as used in the device is shown. It is well known that when the electromagnet is initially energized its flux curve will follow the curve $a$ to $b$. When the magnetization force, i.e., the current flowing through the magnet coil is removed, the flux will follow the curve $b$ to $c$. It is clearly seen a residual flux as represented by the position of point $c$ will remain after the current flow through the magnet coil ceases. To remove this force a negative magnetizing force, $d$, will be necessary before the flux will return to zero as represented by the point $a$ on the curve. It is to be appreciated that the residual flux in electromagnets may cause sticking of the armature of the electromagnet after the magnetizing force is removed. When the coils are arranged as shown in Figs. 9 and 10, the effect of this residual force is effectively cancelled. In Figs. 9 and 10 of the drawings numeral 1a indicates the frame, the numerals 2a and 3a the coils, and 4a and 5a the cores of the electromagnet. The numerals 31a and 55a respectively indicate the armatures which are attracted by the electromagnetic coils 2a and 3a. These armatures are pivoted at a common pivot on the frame. In the figures, the numeral 86 indicates the connection which forms the pivot for the armature 31a on the frame 1a. When the coils are both initially energized for the desired polarity as in Fig. 9, the flux path for the electromagnet 2a will follow the solid line 100 and will be in the direction of the indicating arrow. The flux from the electromagnet 3a will follow the path indicated by the dotted line 102 and be in the direction of the indicating arrow. As indicated in Fig. 7, when the switch 88 is moved from the position No. I to position No. II, the flow of current through electromagnetic coil 5a ceases. At this time the magnetic flux will follow the lines 100a and 102a in Fig. 10. It is clearly apparent that the direction of the arrow from the coil 2a as represented by line 100a is in the opposite direction as it passes through the core 5a. This flux will effectively cancel the residual magnetism which would otherwise be present in core 5a and the effect of the sticking armature is completely eliminated.

It is to be appreciated that while in Fig. 7 the rectifier 94 provides one form of a time delay arrangement for the release of the armature 96 so as to delay the closing of the contacts 87, other forms of timing methods well known to the art may be employed. These arrangements may include the inclusion of a coil slug or the substitution of a capacitor or resistor for the rectifier or combinations thereof. These arrangements are all well known. It is also to be appreciated that another arrangement for varying the time duration of the release of armature 96 may be accomplished by reversing the polarity of coil 2a in Fig. 9. When this arrangement is utilized, the flux from coil 2a will be additive to the residual magnetism rather than in opposition thereto as shown in Fig. 10, so that the time delay of the release of the armature 55a will be considerably increased.

In Fig. 11 of the drawings, the device according to the present invention is shown with the switch 88 in the "OFF" position wherein engagement by the normally closed contacts 63a and 64a is shown and the contacts 39a and 41a are open. When the switch is moved to position No. I in Fig. 7, the magnet coils 3a and 2a are both energized. As was previously pointed out, the coil 2a has insufficient strength to attract the armature 31a. However, the coil 3a has ample strength to attract armature 55a and because of the mechanical interconnection as represented by the insulating part 36a, the armature 31a will be brought into close proximity to the coil 2a to permit the movement of the armature 31a to the actuated position by coil 2a, thereby causing the closure of contacts 39a and 41a. As clearly seen in this embodiment, the armatures 31a and 55a are pivoted on a common pivot and are individually spring biased by means of springs 34a and 56a respectively. When the switch is moved to position No. II as in Fig. 7, it will be seen that the smaller coil 2a will remain energized while the larger coil 3a which consumes the larger amount of current is de-energized. The release of this coil will be delayed by the self induced current flow through rectifier 94 and will be effectively accomplished by the reverse flow of flux emanated from the the coil 2a. After a sufficient period of time the armature 55a will move to a de-energizing position reclosing the contacts 63a and 64a while the contacts 39a and 41a remain closed because of the energization of the coil 2a. The de-energization of this coil 2a is effected when the switch is moved to the OFF position.

One of the features of the device according to the present invention is that the switch in the starting resistor circuit is first opened before the line switch 86 is closed and the switch in the starting resistor shunt circuit is closed a predetermined time after the control switch is moved to its No. II or "run" position. This arrangement will protect the motor operation with a device that occupies a very small space, consumes a minimum amount of current and is inherently reliable in its operation. Further it will be seen that the coil 3a is larger than coil 2a and requires considerably more current to maintain its cooperating armature in the actuated position. The coil 3a is basically an intermittent duty coil in the circuit while the coil 2a is continuously energized whenever the motor is to be energized. This arrangement will conserve electrical energy which is very important if the motor is to be supplied from batteries such as are used to power electric trucks and the like.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. An electric switch having a pair of spaced electromagnetic actuators, a separate magnetizable armature operatively associated with each of said actuators, an electrical contact associated with each of said armatures and operable between an open and closed position by said armatures, a common pivot for said armatures, and a one-way mechanical interconnection between said armatures arranged so energization of both of said actuators is necessary to effect complete operation of both armatures while energization of a selected one of said actuators effects operation of only the armature operatively associated with said one actuator after both of said actuations have been energized.

2. An electric switch comprising a frame member, a pair of electromagnetic coils individually mounted on said frame member, a pair of magnetizable armatures pivotally supported on said frame member at a common pivot and biased to unattracted position with respect to said electromagnetic coils, one of said armatures being magnetically coupled with one of said coils to be attracted by said coil upon energization thereof, the other of said armatures being magnetically coupled with the other of said coils to be electromagnetically attracted thereto, mechanical means interconnecting said first mentioned armature with said second mentioned armature to effect movement of said second mentioned armature upon energization of said first electromagnetic coil, and a pair of contacts connected with each of said armatures to be operated thereby, said mechanical connection being arranged so the operation of each of said pairs of contacts will be effected upon energization of said first electromagnetic coil and one of said pairs of contacts will be maintained operated upon energization of said second electromagnetic coil after de-energization of said first electromagnetic coil.

3. An electric switch comprising a pair of spaced magnet cores each having an electromagnetic coil thereon, an armature individual to each core, the first of said armatures being associated with a first of said electromagnetic coils to be attracted thereto upon energization of said coil, the second of said armatures being associated with the second of said coils, a pair of normally closed contacts, a pair of normally open contacts, means connecting the first of said armatures with one of said normally closed contacts, means connecting said second armature with one of said normally open contacts, said means connecting said first armature including means cooperating with said means connecting said second armature whereby energization of said first coil effects movement of said second armature to operate both said normally open and normally closed contacts, said cooperating means being inoperative upon energization of said second electromagnetic coil and de-energization of said first electromagnetic coil.

4. The electric switch of claim 3 having time delay means associated with said first electromagnetic coil for maintaining its associated armature in an attracted position for a predetermined time period after de-energization of said first electromagnetic coil.

5. The electric switch of claim 4, said pair of electromagnetic coils being structurally related to a common flux path whereby reversal of polarity of one of said coils affects the period of said time delay means.

6. The electric switch of claim 5, said time delay means including a rectifying means for maintaining the first of said electromagnetic coils energized for a finite period after flux collapse in said coil.

7. An electric switch comprising a pair of electromagnetic coils, a frame individually supporting said coils, a first magnetizable armature pivotally supported on said frame in cooperating alignment with the first of said electromagnetic coils so as to be attracted thereto upon energization of said coil, a second magnetizable armature pivotally supported on said frame and surrounding said first armature, said second armature being in cooperating alignment with the second of said electromagnetic coils so as to be effected thereby upon energization of said second coil, means biasing said armatures into unattracted position, a movable and stationary contact associated with each of said armatures, said contacts associated with said first armature being biased into engaged position by said biasing means, said contacts associated with said second armature being biased into open position by said biasing means, mechanical means interconnecting said first and second armature whereby energization of said first electromagnetic coil effects movement of the second armature to effect opening of the contacts associated with said first armature and closing of the contacts associated with said second armature, said interconnecting means being inoperative only upon energization of said second electromagnetic coil and de-energization of said first electromagnetic coil.

8. An electric switch having a pair of electromagnetic coils each positioned on a separate magnet core, a pair of pivotally supported magnetizable members, the first of said members being magnetically associated with a first of said electromagnetic coils, the second of said members being magnetically associated with a second of said electromagnetic coils, a mechanical interconnection between the first of said members and the second of said members, said interconnection being operative in one direction of movement between said members and inoperative in the opposite relative direction of movement between said members, the first of said electromagnetic coils being operative to magnetically attract said first member, said interconnection being effective to move said second member with said first member, said second electromagnetic coil being operative to maintain said second member in an attracted position without control of said first member, and paired electrical contacts associated with each of said members to be operated upon movement of said members.

9. An electromagnetic switch having a first and a second electromagnetic coil each having an individual magnet core, pivotally supported magnetizable members associated with each of said electromagnetic coils to be operated thereby, spaced pairs of contacts associated with each of said members to be operated thereby, one of said members being associated with the first of said electromagnetic coils and being movable to attracted position upon energization of said first electromagnetic coil, the other of said members being associated with the second of said electromagnetic coils and being maintained in attracted position to effect positioning of the contacts associated therewith upon energization of the second of said electromagnetic coils, mechanical interconnecting means operative between said first and said second members and being operative to effect movement of said second member with said first member upon energization of said first electromagnetic coil, said interconnection being effective to operate the contacts associated with said first member before effecting operation of the contacts associated with said second member, and said mechanical interconnection permitting relative movement of said first member from said second member without effecting movement of said second member.

10. An electric switch comprising a frame member, a pair of electromagnetic coils individually mounted in spaced relation on said frame, a pair of magnetizable members pivotally supported on said frame at a common pivot plane and above said coils, the first of said members being magnetically associated with a first of said electromagnetic coils, the second of said members being U-shaped and surrounding said first member and being magnetically associated with the second of said electromagnetic coils, spaced pairs of contacts, means interconnecting said members individually with one of said pair of spaced contacts, said interconnecting means providing a one-way mechanical connection between said members whereby magnetic attraction of said first member to said first coil effects mechanical movement of said second member with said first member, said mechanical interconnection permitting said second member to be maintained in attracted position to said second electromagnetic coil while permitting relative movement of said first member with respect to said second member without effecting movement of said second member.

11. In an electromagnetic switch, the combination comprising; a frame, a first electromagnet having a core mounted on the frame, a second electromagnet having a core mounted on the frame in parallel spaced relation to the core of the first electromagnet, a pair of magnetizable armatures pivotally carried at a common pivot on the frame, one of said armatures being associated with the first electromagnet and being movable to an attracted position upon energization of said first electromagnet, the other of said armatures being associated with the second electromagnet and arranged to be held in an actuated position by the second electromagnet, two pairs of contacts, one of said pair of contacts being arranged to be actuated by the one armature and the other of said pair of contacts being arranged to be actuated by the other armature, mechanical means movable by the one armature and arranged to move the other armature when the first electromagnet is energized, said other armature having a portion thereof extending adjacent a portion of the core of the first electromagnet to provide a path for flux which opposes a flux through the first electromagnet which is induced when the first electromagnet is de-energized and the second electromagnet is energized.

12. In an electromagnetic switch, the combination comprising; a frame, a first electromagnet having a core mounted on the frame, a second electromagnet having a core mounted on the frame in parallel spaced relation to the core of the first electromagnet, a pair of magnetizable armatures pivotally carried at a common pivot on the frame, one of said armatures being associated with the first electromagnet and being movable to an attracted position upon energization of said first electromagnet, the other of said armatures being associated with the second electromagnet and arranged to be held in an actuated position by the second electromagnet, two pairs of contacts, one of said pair of contacts being arranged to be actuated by the one armature and the other of said pair of contacts being arranged to be actuated by the other armature, means for selectively completing a circuit for energizing said electromagnets, mechanical means movable by the one armature and arranged to move the other armature when the first electromagnet is energized, said other armature having a portion thereof extending adjacent a portion of the core of the first electromagnet to provide a path for flux which opposes a flux through the first electromagnet which is induced when the first electromagnet is de-energized and the second electromagnet is energized.

References Cited in the file of this patent
UNITED STATES PATENTS

| | | |
|---|---|---|
| 1,750,902 | Obergfell | Mar. 18, 1930 |
| 1,981,259 | Wertz | Nov. 20, 1934 |
| 2,402,722 | Bean et al. | June 25, 1946 |
| 2,491,643 | Burks | Dec. 20, 1949 |
| 2,571,803 | Winter | Oct. 16, 1951 |
| 2,623,136 | Mekelburg et al. | Dec. 23, 1952 |
| 2,896,046 | Diepenhorst et al. | July 21, 1959 |